May 9, 1933.   M. H. WARD   1,907,914
METHOD AND DEVICE FOR COLLAPSING BELLOWS AND THE LIKE
Filed Aug. 12, 1929
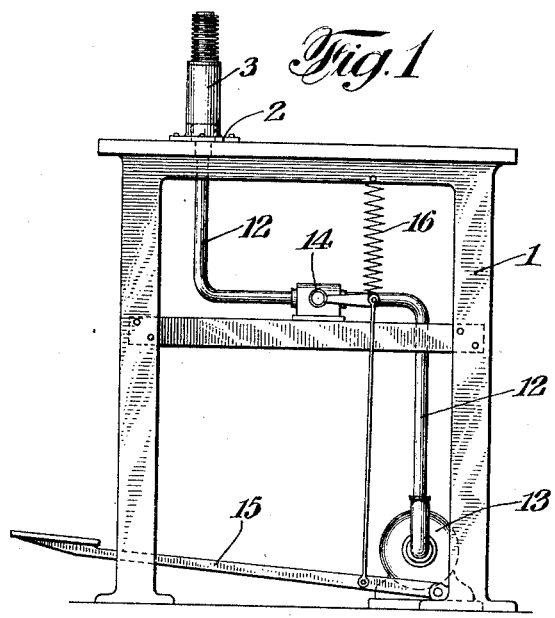
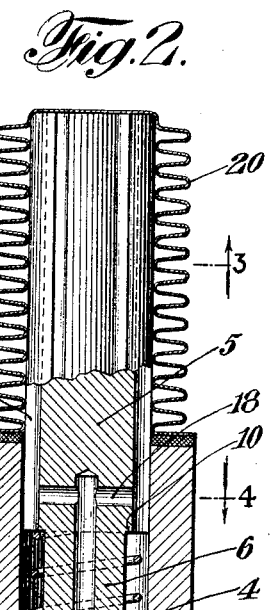
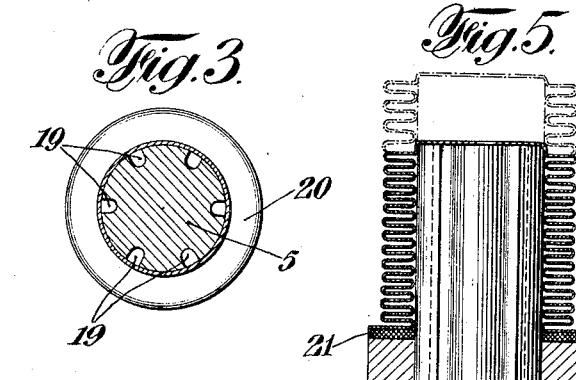
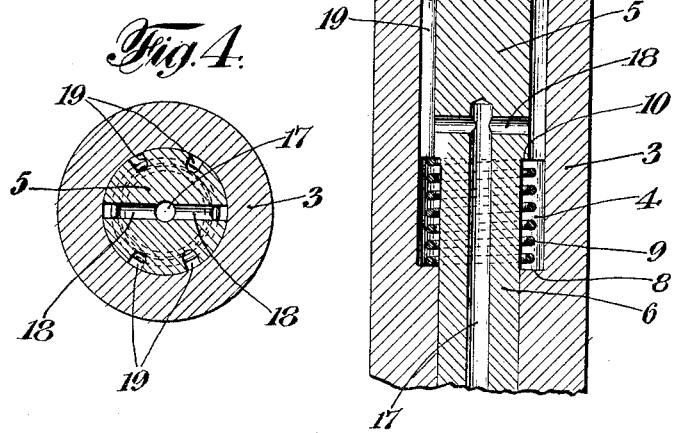
INVENTOR
Marshall H. Ward
BY
Brindle, Wright, Bean Thay
ATTORNEYS Patented May 9, 1933

1,907,914

UNITED STATES PATENT OFFICE

MARSHALL H. WARD, OF BROOKLYN, NEW YORK

METHOD AND DEVICE FOR COLLAPSING BELLOWS AND THE LIKE

Application filed August 12, 1929. Serial No. 385,450.

This invention relates to improvements in method of and device for collapsing corrugated bellows, diaphragms, and the like; and the principal object of this invention is the provision of such a method and such a device whereby machine-formed corrugated bellows, diaphragms, and the like may be collapsed quickly without undue stress or strain, and then released in a normal form adapted for use in connection with various appliances and instrumentalities.

A further object of this invention relates to the method of collapsing such devices which includes exhausting the air therein and opposing the collapsing thereof by a resilient or yieldable element.

Another object of this invention is the provision of a device upon which the formed bellows or diaphragms is positioned, said devices including a plunger or piston normally held in an extended position, and means whereby the air may be exhausted within the bellows so as to permit the collapse of the bellows under atmospheric pressure, the plunger or piston being yieldably mounted so as to resiliently oppose the collapse of the bellows.

Further objects of this invention include improvements in details of construction and arrangement whereby my method may be quickly and efficiently practiced.

To the accomplishment of the foregoing and such other objects as may hereinafter appear, this invention consists in the method and the construction, combination and arrangement of parts hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my invention idea.

In the drawing—

Figure 1 represents a side elevation of one form of device embodying my invention, mounted for operation on a suitable table or support with the necessary accessories;

Figure 2 is a combined vertical section and side elevation of the device itself with a bellows or diaphragm in position thereon prior to the collapsing operation;

Figure 3 is a horizontal transverse cross-section taken substantially on line 3—3 of Figure 2;

Figure 4 is a horizontal transverse cross-section taken substantially on line 4—4 of Figure 2; and Figure 5 is a view of the upper portion of Figure 2 showing the parts in collapsed position, dotted lines indicating the natural position or length of the diaphragm or bellows.

In the making of corrugated metal tubes of thin wall structure such as are used as bellows or diaphragms in various devices and appliances, the completed article is produced in an extended or expanded form. This statement has reference to the natural or normal length of the bellows or diaphragm from which it may be expanded or collapsed, the bellows or diaphragm, of course, having sufficient resiliency to permit this action. It has been customary to collapse abnormally extended devices manually and in other ways, which results in unevenness or irregularity of the devices due to differences in wall structure and, therefore, relative displacement between the convolutions of the bellows or diaphragm. Furthermore, such practices have resulted in extending or compressing parts of the devices to greater extent than others, thereby weakening the devices or rendering them less efficient than they should be to give proper service when in use. This is a serious disadvantage when it is realized that these devices in use have to operate literally millions of times over an extended period of use.

It is, therefore, a decided advantage and, in fact, a necessity that these devices be collapsed uniformly and without any additional injurious strain or stress to the wall structure thereof, and this invention accomplishes this collapsing by means of atmospheric pressure acting against the bellows or diaphragm and yieldingly opposed by a mandrel or piston fitting within the same.

Referring now to the drawing, the numeral 1 designates a suitable table or support upon which the various parts of this apparatus may be mounted. The collapsing fixture itself comprises a base or supporting member 2 on which is mounted, preferably in a vertical position, a cylinder 3. This cylinder is provided with the internal chamber or compartment 4 to slidably receive the mandrel 5, which is in the form of a piston or plunger, as shown, having the reduced portion or stem 6, which slidably fits within the reduced chamber or compartment 7, the junction between the chambers or compartments 4 and 7 being defined by the shoulder 8 upon which one end of spring 9 rests, the other end engaging the shoulder 10 formed by the reduction of the piston or plunger 5 to form the stem 6 thereof. This spring is for the purpose of normally supporting the plunger or piston 5 in its extended position and also to oppose the retraction or downward movement thereof with resilient pressure.

The retraction of the piston or plunger 5 from its extended position, shown in Figure 2, to its retracted position, shown in Figure 5, is accomplished by means of atmospheric pressure as follows. The fixture is provided with the nipple 11 to which is connected pipe or conduit 12 leading to suction pump 13. In this pipe or conduit 12 is interposed a valve 14 adapted to be operated by means of a treadle 15 and spring 16. When the treadle is depressed communication is established between suction pump 13 and the chamber or compartment 7 within the fixture and when the treadle is released, due to the action of spring 16 communication between the said chamber or compartment and the suction pump will be broken and atmospheric pressure admitted into the system. The stem 6 is provided with a longitudinally extending port or passage 17 having the radial ports or passages 18 at the end leading to and communicating with the longitudinal grooves 19 formed on the outer surface of the plunger or piston 5. The thin-walled corrugated bellows or diaphragm are designated 20 and after being shaped, as shown, are then placed upon the fixture in the position indicated in Figure 2. The length of the bellows or diaphragm there illustrated indicates its length when the forming operation is complete and it is removed from the forming machine. The open end of this bellows or diaphragm rests upon the washer member 21 so as to provide the necessary seal. With the bellows or diaphragm in the position shown in Figure 2, the operator depresses the treadle whereby the air within the fixture and the bellows or diaphragm is exhausted, thus causing the collapse of the bellows or diaphragm and the downward movement of the piston or plunger due to the external atmospheric pressure. This downward movement of the plunger or piston and the collapse of the bellows or diaphragm are yieldingly or resiliently opposed by means of the spring 9 until the bellows or diaphragm is completely collapsed and the plunger or piston reaches the downward limit of its path. Then the operator releases the treadle, thereby admitting atmospheric pressure within the fixture and permitting the spring 9 to force the plunger or piston 5 upwardly, breaking the seal between the open end of the bellows or diaphragm and the washer 21 and permitting the bellows or diaphragm to resiliently extend to its normal length and also permitting the ready removal of the bellows or diaphragm from the fixture.

As shown in the drawing, the mandrel 5, especially the head part which I have termed piston or plunger, is adapted to fit the end of the corrugated bellows or diaphragm 20 and is of such diameter so as to fit against the inner convolutions. Furthermore, this mandrel is of sufficient length so as to extend entirely through the diaphragm or bellows so as to support the same from the extended position to the collapsed position. Furthermore, the mandrel itself is guided within the support by means of the engagement of the plunger or piston with the walls of the bore 4 and by the engagement of the stem 6 with the walls of the bore 7. These features are all important in that they prevent any deformation or misshaping of the bellows or diaphragm while being collapsed or while being removed from its fixture after being collapsed.

This operation results in the uniform collapsing of the bellows or diaphragm without any undue stress or strain and fixes the normal length of the bellows, as they are collapsed, sufficiently so that they extend to their normal length due to the inherent resiliency of the structure.

What I claim is:—

1. In the method of collapsing a thin-walled corrugated metallic element, the steps which include exhausting the air within the element and yieldingly opposing the collapse of the element under atmospheric pressure.

2. In the method of collapsing a formed metal element having corrugated thin walls, the steps of exhausting the air within said element whereby atmospheric pressure causes the collapse thereof, and yieldingly opposing the collapse of said element.

3. A device of the character described including, in combination, means for exhausting the air from a thin-walled corrugated metallic element and means for yieldingly opposing the collapse thereof the collapsing being effected by atmospheric pressure.

4. A device of the character described including, in combination, means for exhausting the air from a thin-walled corrugated metallic element and means for yieldingly opposing the collapse thereof, the collapsing being effected by atmospheric pressure, said last-mentioned means including a piston or plunger for supporting the metal element and a spring normally opposing the retracting movement of said piston or plunger.

5. A device of the character described including, in combination, a support, a piston or plunger movably mounted in said support, said piston or plunger serving as a means to support a corrugated metallic element, air-pressure reducing means operatively connected to said support whereby the pressure may be reduced within the metallic element so as to permit its collapse under atmospheric pressure, and means associated with said piston or plunger for resiliently opposing the collapsing movement of the metallic element.

6. A device of the character described including, in combination, a support, a piston or plunger movably mounted in said support, said piston or plunger serving as a means to support a corrugated metallic element, air-pressure reducing means operatively connected to said support whereby the pressure may be reduced within the metallic element so as to permit its collapse under atmospheric pressure, and means associated with said piston or plunger for resiliently opposing the collapsing movement of the metallic element, said piston or plunger being provided with ports or passages so as to afford communication between the interior of the metallic element and said pressure reducing means.

7. A device of the character described including, in combination, a cylindrical support adapted to have connection with an air-pressure reducing means, said cylindrical support having bores of two diameters, a plunger or piston fitting within one of said bores and having a reduced stem fitting within the other of said bores, and resilient means for normally holding the piston or plunger in an extended position to receive a corrugated metallic element thereon, said piston and stem being provided with ports and passages so as to afford communication between the interior of said metal element and the connection to the air pressure reducing means.

8. A device of the character described including, in combination, a support, a mandrel movably mounted on said support and adapted to be positioned within a corrugated metal element and support and guide the same, and means for yieldingly holding the mandrel within said element so as to permit the collapse of the element against the pressure of the yieldingly-held mandrel.

9. A device of the character described including, in combination, a support, a mandrel movably mounted on said support and adapted to be positioned within a corrugated metal element and support and guide the same, and means for yieldingly holding the mandrel within said element so as to permit the collapse of the element against the pressure of the yieldingly-held mandrel, said mandrel fitting within the element for its entire length and supporting the element for its entire length during the entire collapsing movement.

10. A device of the character described including, in combination, a support, a mandrel movably mounted on said support and adapted to be positioned within a corrugated metal element and support and guide the same, and means for yieldingly holding the mandrel within said element so as to permit the collapse of the element against the pressure of the yieldingly-held mandrel, means for reducing the air pressure within said element, the yieldingly-holding means operating to cause the mandrel to yieldingly oppose the movement of the metal element in collapsing.

11. A device of the character described including, in combination, a support, a mandrel movably mounted on said support and adapted to be positioned within a corrugated metal element and support and guide the same, and means for yieldingly holding the mandrel within said element so as to permit the collapse of the element against the pressure of the yieldingly-held mandrel, said mandrel being provided with means affording communication between the metal element and air-pressure reducing means to permit the reduction of air pressure within the element and the consequent collapse of the element due to atmospheric pressure thereon.

12. In a device of the character described including, in combination, a vertical support, a mandrel yieldingly mounted therein and normally projecting above said support to receive a formed corrugated metal element, one end of the element resting against said support, and means for reducing the air pressure within the element to permit atmospheric pressure to cause the collapse of the element.

13. In a device of the character described including, in combination, a vertical support, a mandrel yieldingly mounted therein and normally projecting above said support to receive a formed corrugated metal element, one end of the element resting against said support, and means for reducing the air pressure within the element to permit atmospheric pressure to cause the collapse of the element, said mandrel fitting within the element for the entire length of the element.

14. In combination, in a device of the character described, a movable mandrel adapted to fit within a formed corrugated metal element for the entire length thereof, means for reducing the air pressure within the element, and means for yieldingly opposing the movement of the mandrel when the element is collapsed due to atmospheric pressure whereby support is afforded for the entire element.

15. A device of the character described including, in combination, a support, a mandrel movably mounted in said support and adapted to receive a formed corrugated metal element, one end of the metal element being adapted to rest upon said support, means for yieldingly holding said mandrel within the metal element, air-pressure reducing means, a connection between said air-pressure reducing means and said support whereby air pressure may be reduced within the metal element to permit its collapse by atmospheric pressure, and valve means located in said connection to operatively connect said cylindrical support with said pressure reducing means or with atmospheric pressure.

16. The method of collapsing a formed metallic element having corrugated thin walls, which comprises sealing one end of the element, reducing the pressure within the element to collapse the same while resiliently and yieldingly opposing the collapse of the element.

In testimony that I claim the foregoing, I have hereunto set my hand this 26th day of July, 1929.

MARSHALL H. WARD.